(12) United States Patent
Mori et al.

(10) Patent No.: US 10,771,731 B2
(45) Date of Patent: Sep. 8, 2020

(54) DISPLAY DEVICE

(71) Applicant: Funai Electric Co., Ltd., Daito, Osaka (JP)

(72) Inventors: Yasuhiro Mori, Osaka (JP); Akihiro Fujikawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/241,041

(22) Filed: Jan. 7, 2019

(65) Prior Publication Data
US 2019/0141281 A1 May 9, 2019

Related U.S. Application Data

(63) Continuation of application No. 14/598,942, filed on Jan. 16, 2015, now Pat. No. 10,397,512.

(30) Foreign Application Priority Data

Jan. 22, 2014 (JP) .................................. 2014-009370

(51) Int. Cl.
*H04N 5/655* (2006.01)
(52) U.S. Cl.
CPC .................................. *H04N 5/655* (2013.01)
(58) Field of Classification Search
CPC ...................................................... H04N 5/655
See application file for complete search history.

(56) References Cited

U.S. PATENT DOCUMENTS

| | | |
|---|---|---|
| 2002/0118284 A1 | 8/2002 | Newman et al. |
| 2007/0230210 A1* | 10/2007 | Tsai .................. G02F 1/133606 362/600 |
| 2008/0074334 A1 | 3/2008 | Kang |
| 2008/0316338 A1 | 12/2008 | Wakui |
| 2009/0190062 A1 | 7/2009 | Sudo |
| 2010/0170775 A1 | 7/2010 | Lee et al. |
| 2010/0283906 A1* | 11/2010 | Kuromizu ......... G02F 1/133608 348/725 |
| 2013/0107127 A1* | 5/2013 | Yokawa ............ G02F 1/133308 348/725 |
| 2014/0125877 A1* | 5/2014 | Nakamura ............... H04N 5/64 348/843 |
| 2014/0292588 A1 | 10/2014 | Yoon et al. |

(Continued)

FOREIGN PATENT DOCUMENTS

| | | |
|---|---|---|
| JP | 2002-231115 A | 8/2002 |
| JP | 2006-171587 A | 6/2006 |

(Continued)

*Primary Examiner* — Tracy Y. Li
(74) *Attorney, Agent, or Firm* — Global IP Counselors, LLP

(57) ABSTRACT

A display device includes a display panel, a light source, an optical member, a rear chassis and a frame member. The light source is disposed on a rear side relative to the display panel. The optical member is disposed on the rear side relative to the display panel. The rear chassis houses the light source, the rear chassis including an outer peripheral portion with a flat component that extends outward relative to a center of the display device and a bent part that extends rearward from an outer edge of the flat component. The frame member is fastened to the bent part of the rear chassis with a fastening member.

19 Claims, 11 Drawing Sheets

(56) References Cited

U.S. PATENT DOCUMENTS

2015/0241730 A1* 8/2015 Kondoh ............ G02F 1/133608
348/794
2016/0018691 A1 1/2016 Ohashi

FOREIGN PATENT DOCUMENTS

| | | | |
|---|---|---|---|
| JP | 2006-173383 | A | 6/2006 |
| JP | 2006-215512 | A | 8/2006 |
| JP | 2009-145825 | A | 7/2009 |
| JP | 2010-015093 | A | 1/2010 |
| JP | 2011-107683 | A | 6/2011 |
| JP | 2012-053082 | A | 3/2012 |

* cited by examiner

DISPLAY DEVICE

CROSS-REFERENCE TO RELATED APPLICATIONS

This is a continuation application of U.S. application Ser. No. 14/598,942 filed on Jan. 16, 2015, which claims priority to Japanese Patent Application No. 2014-009370 filed on Jan. 22, 2014. The entire disclosures of U.S. application Ser. No. 14/598,942 and Japanese Patent Application No. 2014-009370 are hereby incorporated herein by reference.

BACKGROUND

Field of the Invention

The present invention generally relates to a display device. More specifically, the present invention relates to a display device for displaying an image.

Background Information

There are known display devices for displaying an image, such as a liquid crystal television set (see Japanese Unexamined Patent Application Publication No. 2012-53082 (Patent Literature 1), for example). With such a conventional display device, a housing of the display device is made up of a front cabinet and a rear cabinet. The front cabinet covers the outer peripheral part of the front face of a liquid crystal panel that is disposed in the interior of the housing. The rear cabinet covers the entire rear face of the liquid crystal panel.

SUMMARY

With the display device, there is a need for slimming down a border portion or bezel, which supports the outer peripheral part of the liquid crystal panel.

One aspect is to provide a display device with a slimmer border portion.

In view of the state of the known technology, a display device includes a display panel, a light source, an optical member, a rear chassis and a frame member. The light source is disposed on a rear side relative to the display panel. The optical member is disposed on the rear side relative to the display panel. The rear chassis houses the light source, the rear chassis including an outer peripheral portion with a flat component that extends outward relative to a center of the display device and a bent part that extends rearward from an outer edge of the flat component. The frame member is fastened to the bent part of the rear chassis with a fastening member.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents. Specifically, the numerical values, shapes, materials, constituent elements, layout positions and connection modes of the constituent elements, and so forth given in the following embodiments are provided all just for illustration only and not for the purpose of limiting the present invention. The present invention is merely defined by the appended claims. Of the constituent elements in the following embodiment, those not mentioned in an independent claim are not necessarily needed to achieve the object of the present invention, and will be described for understanding of the embodiment.

Overall Structure of Display Device

Figure 1:
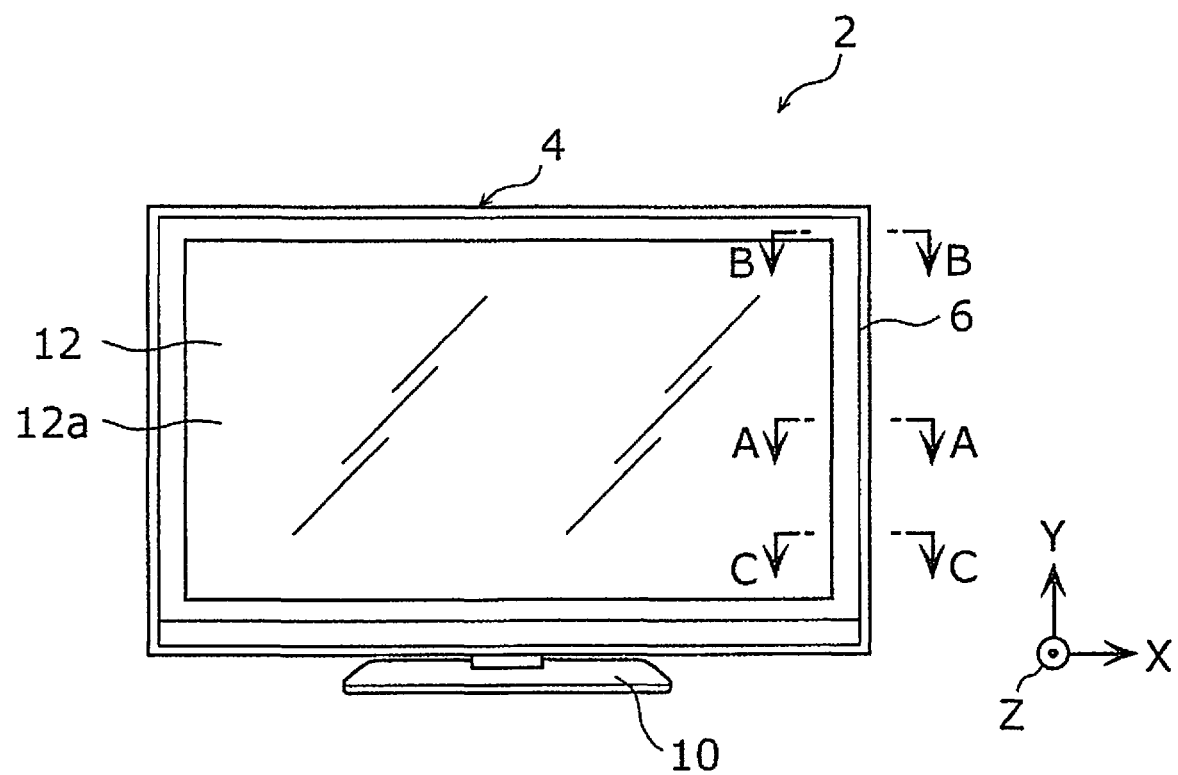
FIG. 1 is an elevational view of a display device in accordance with one embodiment.
Figure 2:
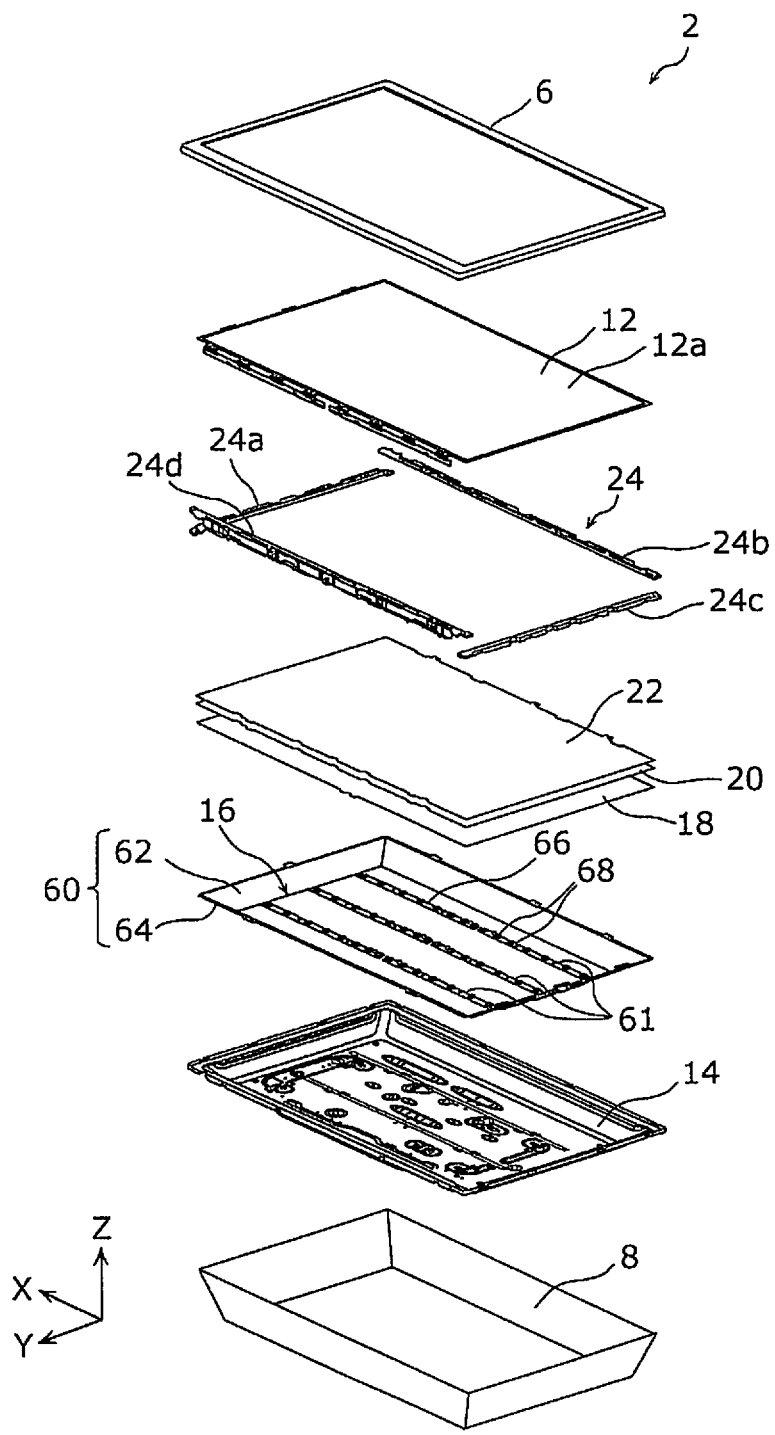
FIG. 2 is an exploded perspective view of the display device in accordance with the embodiment.

The overall structure of a display device 2 in accordance with one embodiment will now be described through reference to FIGS. 1 and 2. FIG. 1 is an elevational view of the display device 2 in accordance with the embodiment. FIG. 2 is an exploded perspective view of the display device in accordance with the embodiment.

As shown in FIGS. 1 and 2, the display device 2 in this embodiment is a liquid crystal television set, for example. The display device 2 includes a housing 4 for holding various parts. The housing 4 is made up of a front cabinet 6 (e.g., a front face housing) and a rear cabinet 8 (e.g., a rear face housing) that are connected together. A stand 10 for supporting the housing 4 from below is attached to the lower end of the housing 4.

Figure 9:
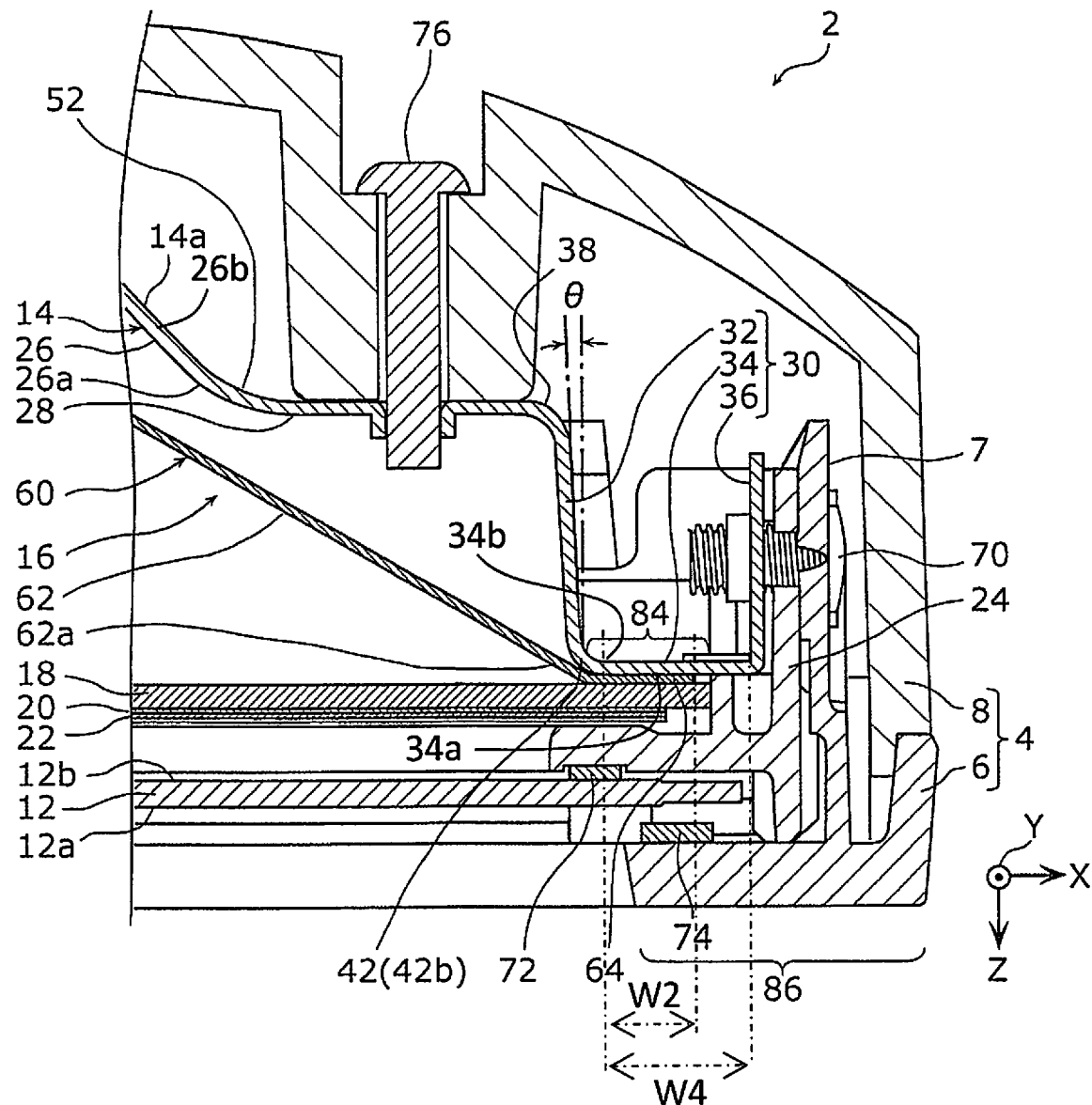
FIG. 9 is a detail cross sectional view of the display device, taken along A-A line in FIG. 1.

The front cabinet 6 is configured in the form of a rectangular frame. The front cabinet 6 is disposed so as to cover the outer peripheral part of a front face 12a of a liquid crystal panel 12 (e.g., a display panel) discussed below. As shown in FIG. 9 discussed below, ribs 7 that extend to the rear cabinet 8 side are provided on the inner face of the front cabinet 6. The front cabinet 6 is molded from plastic, for example.

The rear cabinet 8 has a shape that bulges out slightly to the rear face side of the display device 2. The rear cabinet 8 is disposed so as to cover the entire rear face 12b of the liquid crystal panel 12. As shown in FIG. 9 discussed below, the rear cabinet 8 is connected to the front cabinet 6 around the outside of the liquid crystal panel 12. The rear cabinet 8 is molded from plastic, for example.

As shown in FIG. 2, a rear frame 14, a backlight unit 16, a diffuser plate 18 (e.g., an optical member), a pair of optical sheets 20 and 22 (e.g., optical members), and a molding frame 24 are disposed in addition to the above-mentioned liquid crystal panel 12 in the interior of the housing 4. The internal structure of the display device 2 will be discussed below.

Structure of Rear Frame

Figure 3:
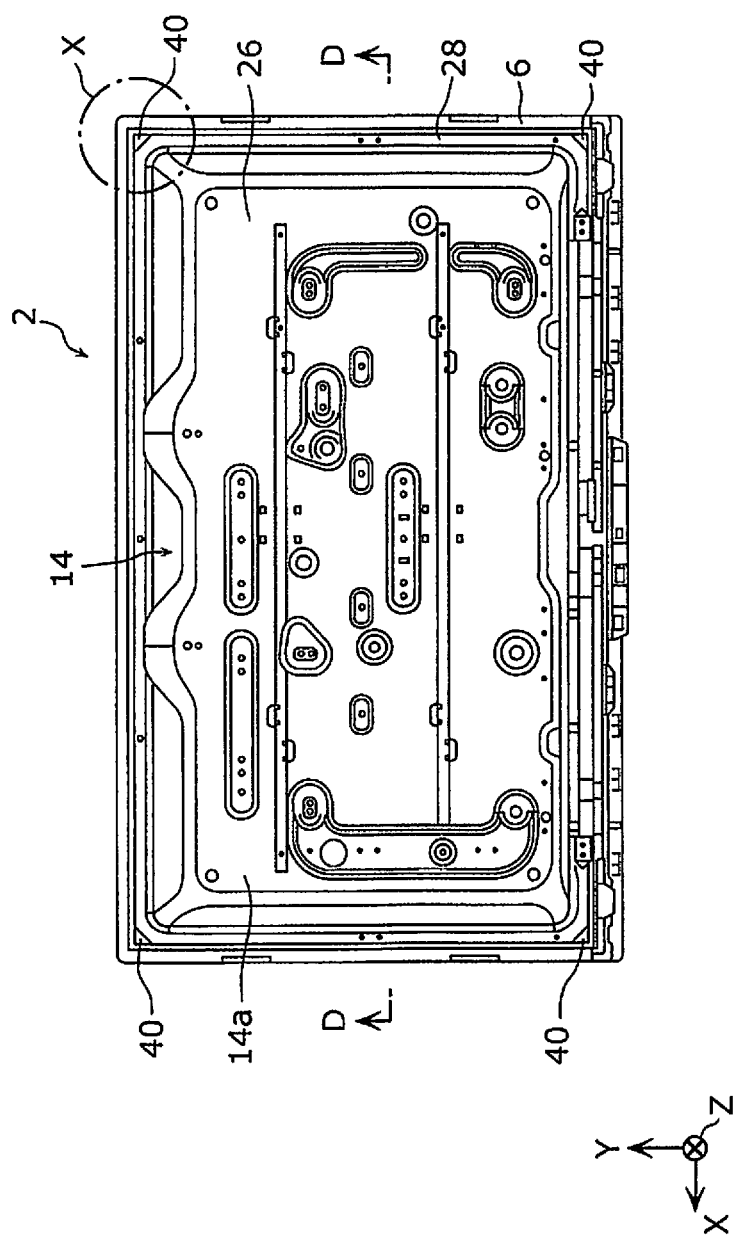
FIG. 3 is an elevational view of a rear face side of a rear frame.
Figure 4:
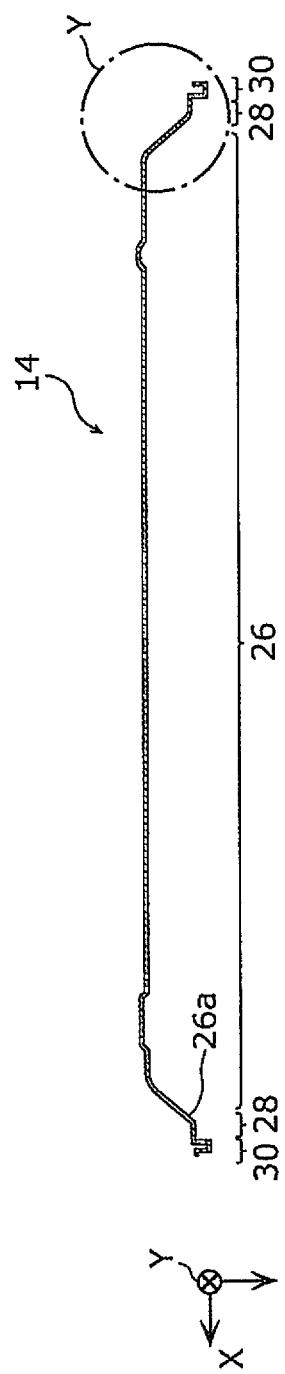
FIG. 4 is a cross sectional view of the rear frame, taken along D-D line in FIG. 3.
Figure 5:
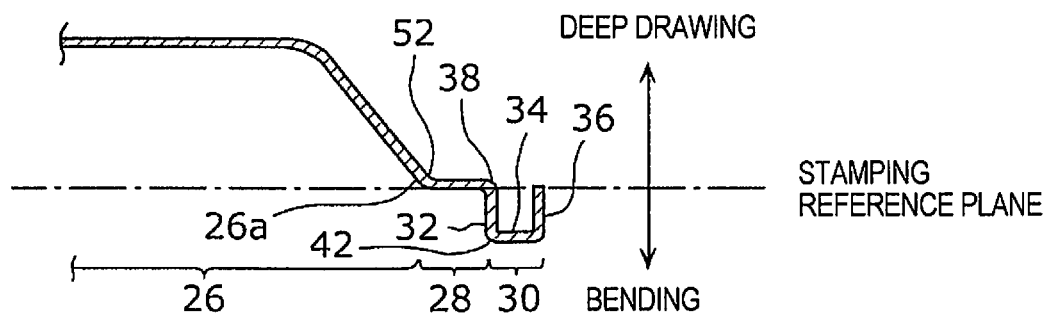
FIG. 5 is a detail cross sectional view of the rear frame, illustrating a portion Y circled by a one-dot chain line in FIG. 4.
Figure 6:
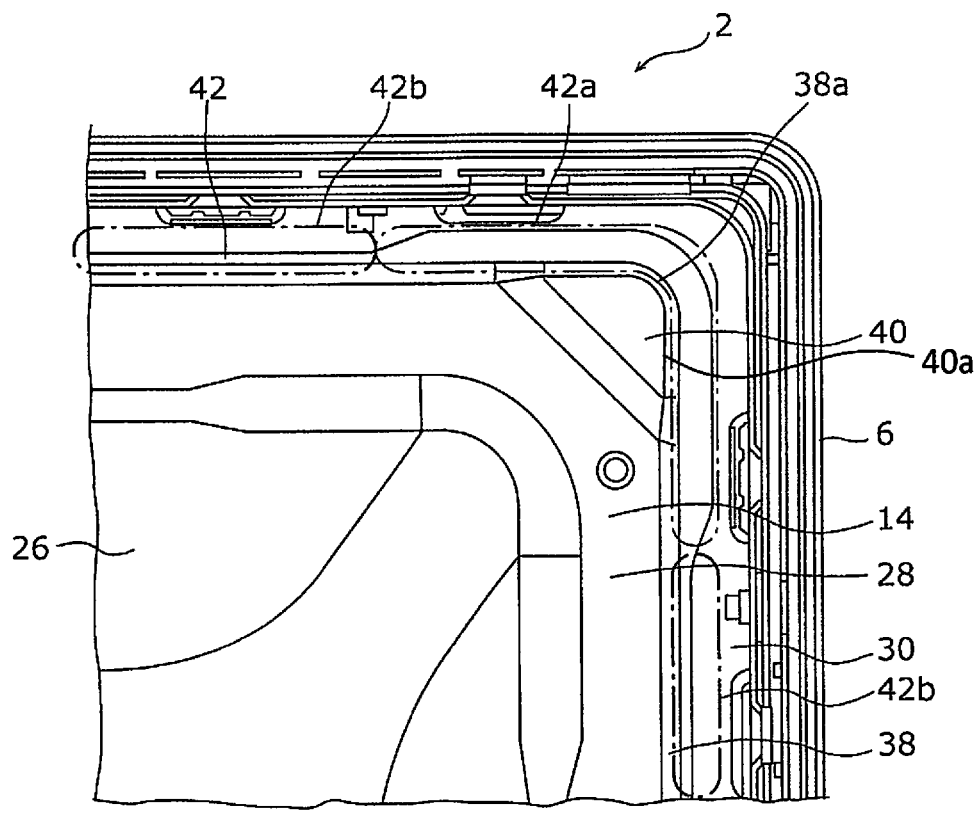
FIG. 6 is a detail plan view of the rear frame, illustrating a portion X circled by a one-dot chain line in FIG. 3.
Figure 7:
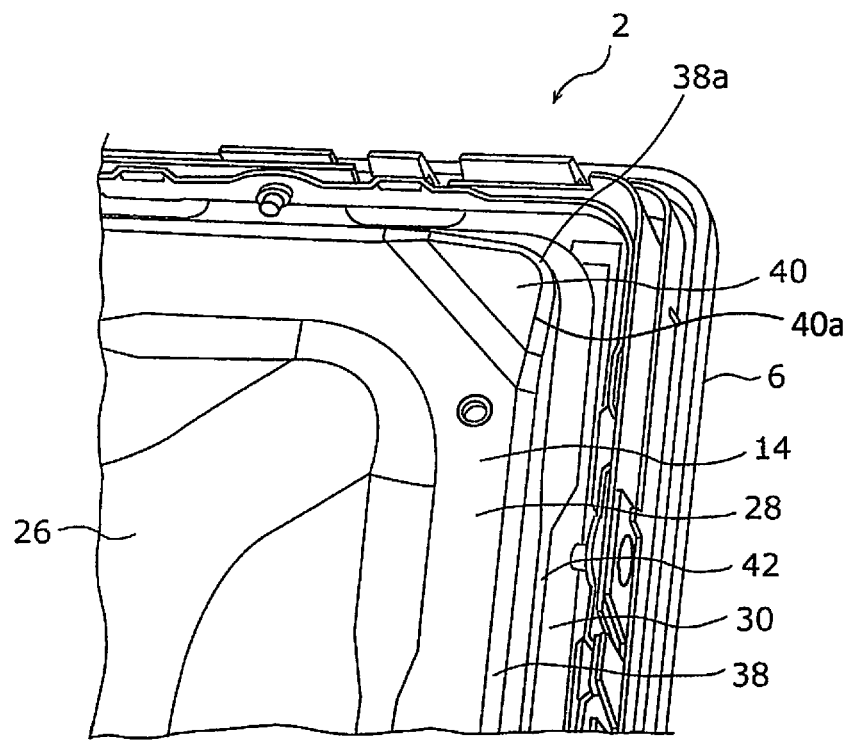
FIG. 7 is a detail perspective view of the rear frame, illustrating the portion X in FIG. 3.

Next, the structure of the above-mentioned rear frame 14 will be described through reference to FIGS. 2 to 7. FIG. 3 is an elevational view of a rear face side of the rear frame. FIG. 4 is a cross sectional view of the rear frame 14, taken along D-D line in FIG. 3. FIG. 5 is a detail cross sectional view of the rear frame 14, illustrating a portion Y circled by a one-dot chain line in FIG. 4. FIG. 6 is a detail plan view of the rear frame 14, illustrating the portion X circled by a one-dot chain line in FIG. 3. FIG. 7 is a detail perspective view of the rear frame 14, illustrating the portion X in FIG. 3. Also, FIG. 3 shows a state in which the display device 2 is viewed from the rear face side after the rear cabinet 8 has been removed.

As shown in FIG. 2, the rear frame 14 is a metal frame that supports the above-mentioned backlight unit 16, the diffuser plate 18, and the pair of optical sheets 20 and 22. The rear frame 14 is disposed on the inner face of the rear cabinet 8. Specifically, the entire rear face 14a of the rear frame 14 is covered by the rear cabinet 8. The rear frame 14 is formed from sheet metal such as SECC (steel electrically chromate coated).

As shown in FIGS. 3 to 5, the rear frame 14 has a first frame component 26 (e.g., a light source housing component), a second frame component 28 (e.g., a first flat component), and a third frame component 30.

The first frame component 26 is configured in a box shape having a substantially rectangular opening 26a. The first frame component 26 supports a plurality of LED bars 61 (discussed below) of the backlight unit 16 and a reflector 62 (discussed below) of a reflective sheet 60 (e.g., an optical member). In other words, the first frame component 26 houses the LED bars 61. In the illustrated embodiment, as shown in FIG. 9 discussed below, the first frame component 26 has a slanted peripheral part 26b that is slanted towards the liquid crystal panel 12.

The second frame component 28 extends outward from the peripheral edge (e.g., the opening edge) of the opening 26a of the first frame component 26 (that is, toward the outside of the liquid crystal panel 12 in a direction substantially parallel to the liquid crystal panel 12). In the illustrated embodiment, the second frame component 28 extends from an end portion of the slanted peripheral part 26b of the first frame component 26 in the outward direction that is substantially parallel to the liquid crystal panel 12.

The third frame component 30 has a first bent part 32 (e.g., a first extending part), a second bent part 34 (e.g., a second flat component), and a third bent part 36 (e.g., a second extending part). The first bent part 32 is bent from the outer peripheral part of the second frame component 28 to the liquid crystal panel 12 side. As shown in FIG. 9 discussed below, the first bent part 32 is inclined by an angle θ (such as approximately 3 to 5°) outward beyond the perpendicular direction perpendicular to the second frame component 28. The second bent part 34 is bent outward from the end of the first bent part 32. The second bent part 34 is bent substantially perpendicular to the first bent part 32. The third bent part 36 is bent from the end of the second bent part 34 to the rear cabinet 8 side. The third bent part 36 is also bent substantially perpendicular to the second bent part 34. In the illustrated embodiment, third frame component 30 bulges towards the liquid crystal panel 12 from the outer peripheral part of the second frame component 28 to support the outer peripheral part of the optical member, such as the diffuser plate 18, the optical sheets 20 and 22, and the reflective sheet 60. Furthermore, the third frame component 30 includes the first bent part 32 that extends towards the liquid crystal panel 12 from the outer peripheral part of the second frame component 28, and the second bent part 34 that extends from the end (e.g., the end portion) of the first bent part 32 in the outward direction to sandwich the outer peripheral part of the optical member between the liquid crystal panel 12 and the second bent part 34. Also, in the illustrated embodiment, the first bent part 32 is inclined in the outward direction relative to the perpendicular direction perpendicular to the second frame component 28. Also, in the illustrated embodiment, the third frame component 30 further includes the third bent part 36 that extends from the end (e.g., the end portion) of the second bent part 34 away from the liquid crystal panel 12. Thus, in the illustrated embodiment, the second frame component 28 and the second bent part 34 extend in the outward direction relative to the peripheral edge of the opening 26a of the first frame component 26. The second frame component 28 and the second bent part 34 are substantially parallel to the rear face 12b of the liquid crystal panel 12. The second bent part 34 is disposed closer to the liquid crystal panel 12 than the second frame component 28. The second bent part 34 supports the reflective sheet 60, the diffuser plate 18, and the optical sheets 20 and 22.

As shown in FIGS. 3, 6, 7, and 10 discussed below, a bevel 40 (e.g., an inclined surface or a chamfer) is formed on each of the four corners of a peripheral edge 38 (e.g., a peripheral edge portion) between the second frame component 28 and the first bent part 32. In other words, in the illustrated embodiment, the peripheral edge 38 between the second frame component 28 and the third frame component 30 has the bevel 40 (e.g., the inclined surface) at a location corresponding to the corner of the liquid crystal panel 12. In the illustrated embodiment, as shown in FIGS. 6 and 7, the bevel 40 (e.g., the inclined surface) has an overall triangular shape as viewed in a normal direction of the bevel 40. The bevel 40 (e.g., the inclined surface) has an edge portion 40a defining the corner of the peripheral edge 38 between the second frame component 28 and the third frame component 30. The edge portion 40a of the bevel 40 is slanted towards the liquid crystal panel 12 (see FIG. 10) as moving towards the corner of the peripheral edge 38 between the second frame component 28 and the third frame component 30.

Figure 10:
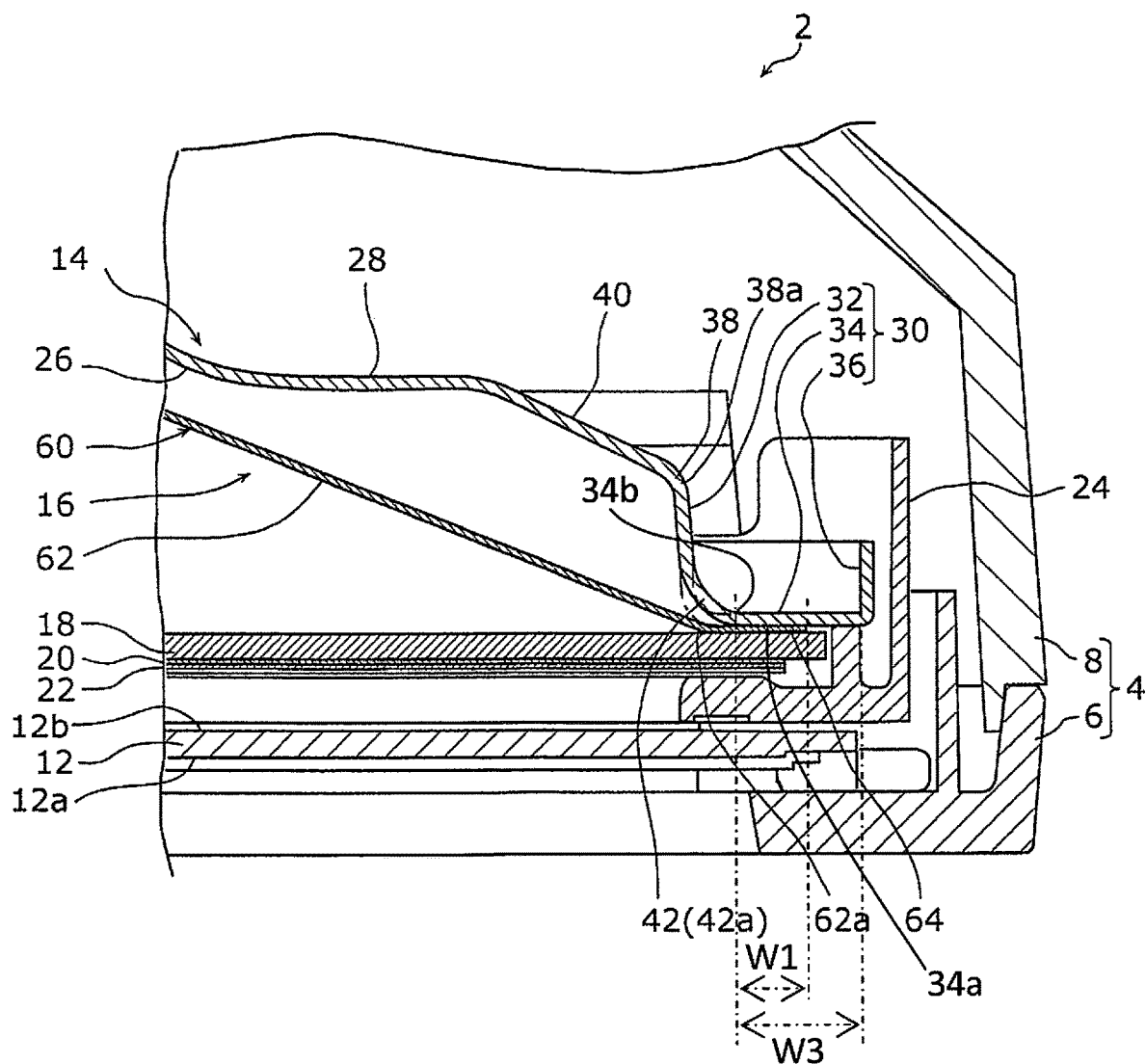
FIG. 10 is a detail cross sectional view of the display device, taken along B-B line in FIG. 1.

As shown in FIGS. 6 and 7, and FIGS. 9 and 10 (discussed below), of the peripheral edge 42 between the first bent part 32 and the second bent part 34, the radius (or the bend radius) (such as approximately 3 mm) at the four corners 42a is larger than the radius (or the bend radius) (such as approximately 1.5 mm) of the portions 42b other than the four corners 42a. In other words, in the illustrated embodiment, the bend radius of the peripheral edge 42 between the first bent part 32 and the second bent part 34 is larger at a location corresponding to the corner of the liquid crystal panel 12 than at a location corresponding to a middle portion of the side of the liquid crystal panel 12. With this arrangement, in the illustrated embodiment, the overlapping width W1 (see FIG. 10) between the support component 64 of the reflective sheet 60 (e.g., the outer peripheral part of the optical member) and the second bent part 34 that is measured in the outward direction at a location corresponding to the corner of the liquid crystal panel 12 is smaller than the overlapping width W2 (see FIG. 9) between the support component 64 of the reflective sheet 60 (e.g., the outer peripheral part of the optical member) and the second bent part 34 at a location corresponding to the middle portion of the side of the liquid crystal panel 12 (i.e., W1<W2). Also, in the illustrated embodiment, as shown in FIGS. 9 and 10, the second bent part 34 has a flat surface 34a. The width W3 (see FIG. 10) between the inward peripheral edge 34b of the flat surface 34a of the second bent part 34 and the third bent part 36 that is measured in the outward direction at a location corresponding to the corner of the liquid crystal panel 12 is smaller than the width W4 (see FIG. 9) between the inward peripheral edge 34b of the flat surface 34a of the second bent part 34 and the third bent part 36 at a location corresponding to the middle portion of the side of the liquid crystal panel 12 (i.e., W3<W4).

Figure 8A:
FIGS. 8A, 8B and 8C are simplified diagrams of a method for forming the rear frame.
Figure 8B:
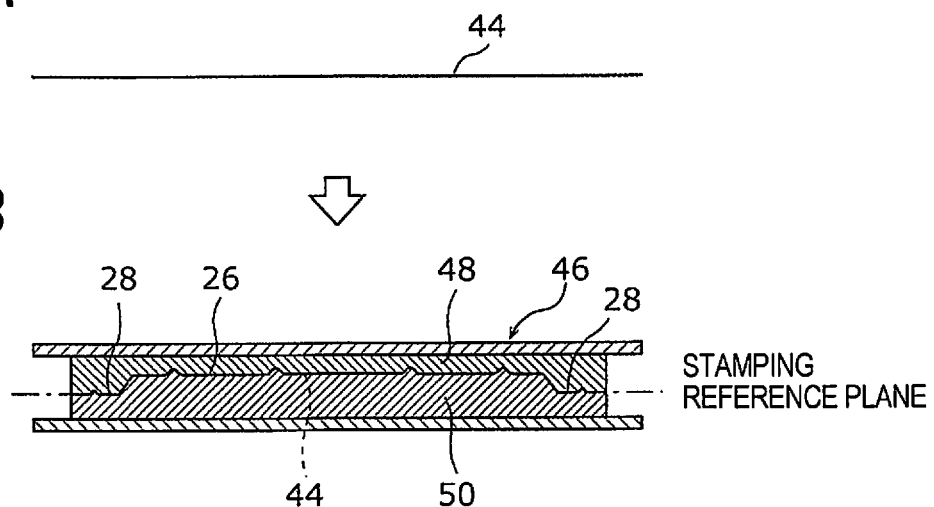
Figure 8C:
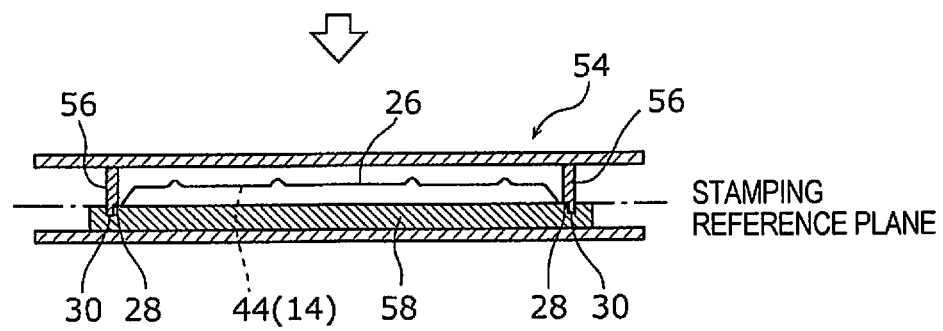

A method for forming the rear frame 14 will now be described through reference to FIGS. 8A, 8B and 8C along with the above-mentioned FIG. 5. FIGS. 8A, 8B and 8C are simplified diagrams of a method for forming the rear frame 14.

First, as shown in FIG. 8A, a thin piece of sheet metal 44 is readied as a blank for forming the rear frame 14. This sheet metal 44 is formed from SECC or the like.

Then, as shown in FIG. 8B, this sheet metal 44 is subjected to drawing, such as deep drawing, between the upper mold 48 and lower mold 50 of a deep drawing press 46 to form (draw) the first frame component 26 and the second frame component 28. As shown in FIG. 5, the sheet metal 44 here is subjected to the deep drawing such that the radius (or the bend radius) will be relatively large at the peripheral edge 52 between the first frame component 26 and the second frame component 28 in order to raise the fluidity of the metal material that forms the sheet metal 44.

After this, as shown in FIG. 8C, the outer peripheral part of the sheet metal 44 in which the first frame component 26 and the second frame component 28 have been formed is bent between the upper mold 56 and lower mold 58 of a bending press 54 to form the third frame component 30. To reduce the accumulation of stress in the four corners of the peripheral edge 38 between the second frame component 28 and the first bent part 32 here, the sheet metal 44 is bent so as to form the bevel 40 on each of these four corners. Furthermore, to allow the bending to proceed smoothly, the first bent part 32 is bent from the outer peripheral part of the second frame component 28 so that the first bent part 32 will be inclined at an angle θ, outward beyond the perpendicular direction of the second frame component 28. In the illustrated embodiment, the first frame component 26, the second frame component 28 and the third frame component 30 are formed by stamping the sheet metal 44. The first frame component 26 and the second frame component 28 are formed by drawing (or deep drawing) the sheet metal 44. The third frame component 30 is formed by forming (or metal forming) the sheet metal 44.

The rear frame 14 is formed as above. With the method in this embodiment for forming the rear frame 14, as shown in FIG. 5, a plane defined by the second frame component 28 serves as the stamping reference plane, the first frame component 26 and the second frame component 28 are each formed by drawing (or deep drawing), and the third frame component 30 is formed by bending (forming or bending of the stamping).

Internal Structure of Display Device

Figure 11:
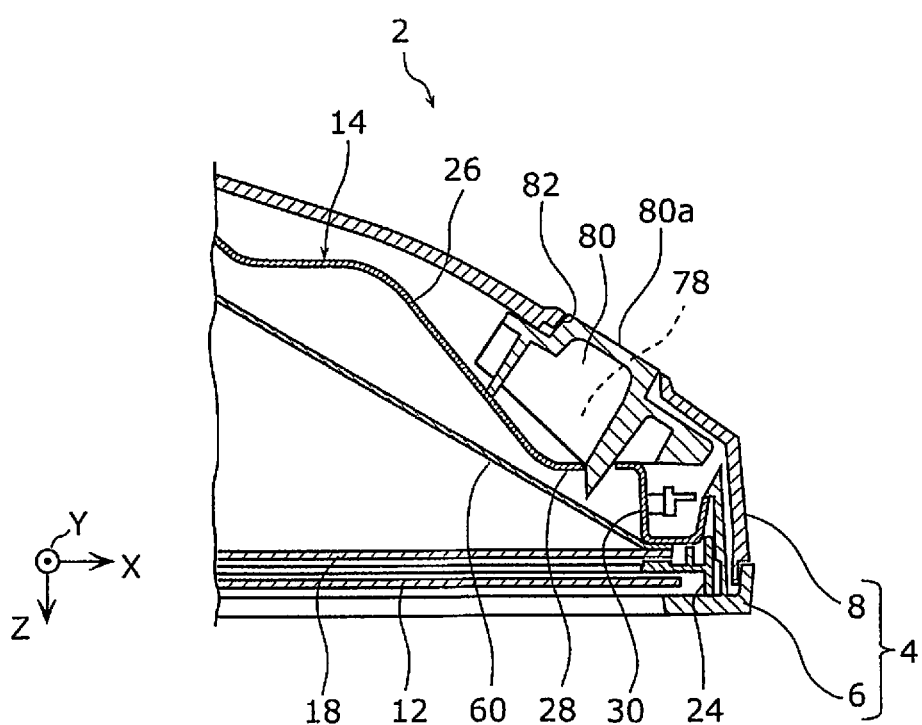
FIG. 11 is a detail cross sectional view of the display device, taken along C-C line in FIG. 1.

Next, the internal structure of the above-mentioned display device 2 will be described through reference to FIGS. 9 to 11, along with the above-mentioned FIG. 2. FIG. 9 is a detail cross sectional view of the display device 2, taken along A-A line in FIG. 1. FIG. 10 is a detail cross sectional view of the display device 2, taken along B-B line in FIG. 1. FIG. 11 is a detail cross sectional view of the display device 2, taken along C-C line in FIG. 1.

As shown in FIG. 2, the backlight unit 16 is a direct backlight unit, and serves to shine line on the rear face 12b of the liquid crystal panel 12. The backlight unit 16 has the reflective sheet 60 and the plurality of LED (light emitting diode) bars 61 (e.g., the light source). In the illustrated embodiment, the first frame component 26 supports the LED bars 61. Also, in the illustrated embodiment, the LED bars 61 are disposed on the rear side relative to the liquid crystal panel 12.

As shown in FIGS. 2, 9, and 10, the reflective sheet 60 has the reflector 62 and a support component 64. The reflector 62 is configured in the form of a box having a substantially rectangular opening 62a, and is supported by the first frame component 26 of the rear frame 14. The reflector 62 is disposed so as to cover the first bent part 32, the second frame component 28, and the first frame component 26 of the rear frame 14. The reflector 62 reflects light from the LED bars 61 toward the rear face 12b of the liquid crystal panel 12. The support component 64 extends outward from the peripheral edge of the opening 62a of the reflector 62 (that is, from the outer peripheral part of the reflector 62). The reflective sheet 60 is formed from polyethylene terephthalate (PET), for example.

The LED bars 61 have a long, slender shape, and are disposed substantially parallel to each other and spaced apart. Each of the LED bars 61 has a wiring board 66 and a plurality of LEDs 68 mounted on the wiring board 66.

The wiring boards 66 are in the form of long, slender boards. The wiring boards 66 are supported on the first frame component 26 of the rear frame 14 via the reflector 62 of the reflective sheet 60. The wiring boards 66 are formed from a metal that conducts heat well, such as aluminum.

The LEDs 68 are disposed spaced apart and in a single row in the lengthwise direction of each wiring board 66. Each of the LEDs 68 has a power LED, for example.

The diffuser plate 18 is configured as a substantially rectangular thin plate, and is disposed between the backlight unit 16 and the liquid crystal panel 12. The diffuser plate 18 is used to diffuse light from the backlight unit 16 toward the rear face 12b of the liquid crystal panel 12.

The pair of optical sheets 20 and 22 are disposed so as to cover the surface of the diffuser plate 18 when they are superposed one over the other. The optical sheets 20 and 22 are used to guide light diffused by the diffuser plate 18 to the rear face 12b of the liquid crystal panel 12.

As shown in FIGS. 9 and 10, the outer peripheral parts of the optical sheets 20 and 22 and the diffuser plate 18 and the support component 64 of the reflective sheet 60 are supported by the second bent part 34 of the third frame component 30 of the rear frame 14. The outer peripheral parts of the optical sheets 20 and 22 and the diffuser plate 18 and the support component 64 of the reflective sheet 60 are sandwiched between the molding frame 24 (discussed below) and the second bent part 34.

The molding frame 24 is configured by putting together four long, slender frame members 24a to 24d into a rectangular frame shape. The molding frame 24 is fastened by screws 70 to the third bent part 36 of the third frame component 30 of the rear frame 14 along with the ribs 7 of the front cabinet 6. The molding frame 24 is formed from plastic, for example.

The liquid crystal panel 12 is configured in the form of a rectangular panel. As shown in FIG. 9, the outer peripheral part of the rear face 12b of the liquid crystal panel 12 is supported by the molding frame 24 via a cushioning member 72. Also, the outer peripheral part of the front face 12a of the liquid crystal panel 12 is supported by the front cabinet 6 via a cushioning member 74. Consequently, the outer peripheral part of the liquid crystal panel 12 is sandwiched between the front cabinet 6 and the molding frame 24. The cushioning members 72 and 74 are used to absorb any impact to which the liquid crystal panel 12 is subjected, and are formed from urethane, for example. When light from the backlight unit 16 shines on the rear face 12b of the liquid crystal panel 12, an image is displayed in the display region of the front face 12a of the liquid crystal panel 12.

As shown in FIG. 9, the rear cabinet 8 is fastened by screws 76 (e.g., fastening members) to the second frame component 28 of the rear frame 14. Thus disposing the fastening face where the rear cabinet 8 and the rear frame 14 are fastened together on the second frame component 28 keeps the size in the thickness direction of the housing 4 (the Z direction) smaller than when this fastening face is disposed on the outer peripheral face of the display device 2.

As shown in FIG. 11, because the rear frame 14 is configured as above, a space 78 is formed between the rear cabinet 8 and the second frame component 28 of the rear frame 14. In this space 78 is disposed a control switch 80 for operating the display device 2, such as switching on and off the main power supply of the display device 2, changing the broadcast channel, and so forth. The control switch 80 is provided with a plurality of push buttons 80a. These push buttons 80a are each exposed to the outside through a hole 82 provided to the rear cabinet 8. In the illustrated embodiment, the display device 2 includes the front cabinet 6 (e.g., the front face housing) covering the outer peripheral part of the front face of the liquid crystal panel 12, the rear cabinet 8 (e.g., the rear face housing) covering the rear face of the rear frame 14, and the screws 76 (e.g., the fastening members) fastening the rear cabinet 8 to the second frame component 28 of the rear frame 14. In the illustrated embodiment, the display device 2 further includes the control switch 80 disposed between the rear cabinet 8 and the second frame component 28 of the rear frame 14 to control the display device 2. Also, in the illustrated embodiment, the display device 2 further includes the screws 70 (e.g., the fastening members) fastening the front cabinet 6 to the third frame component 30.

Effect

Figure 12:
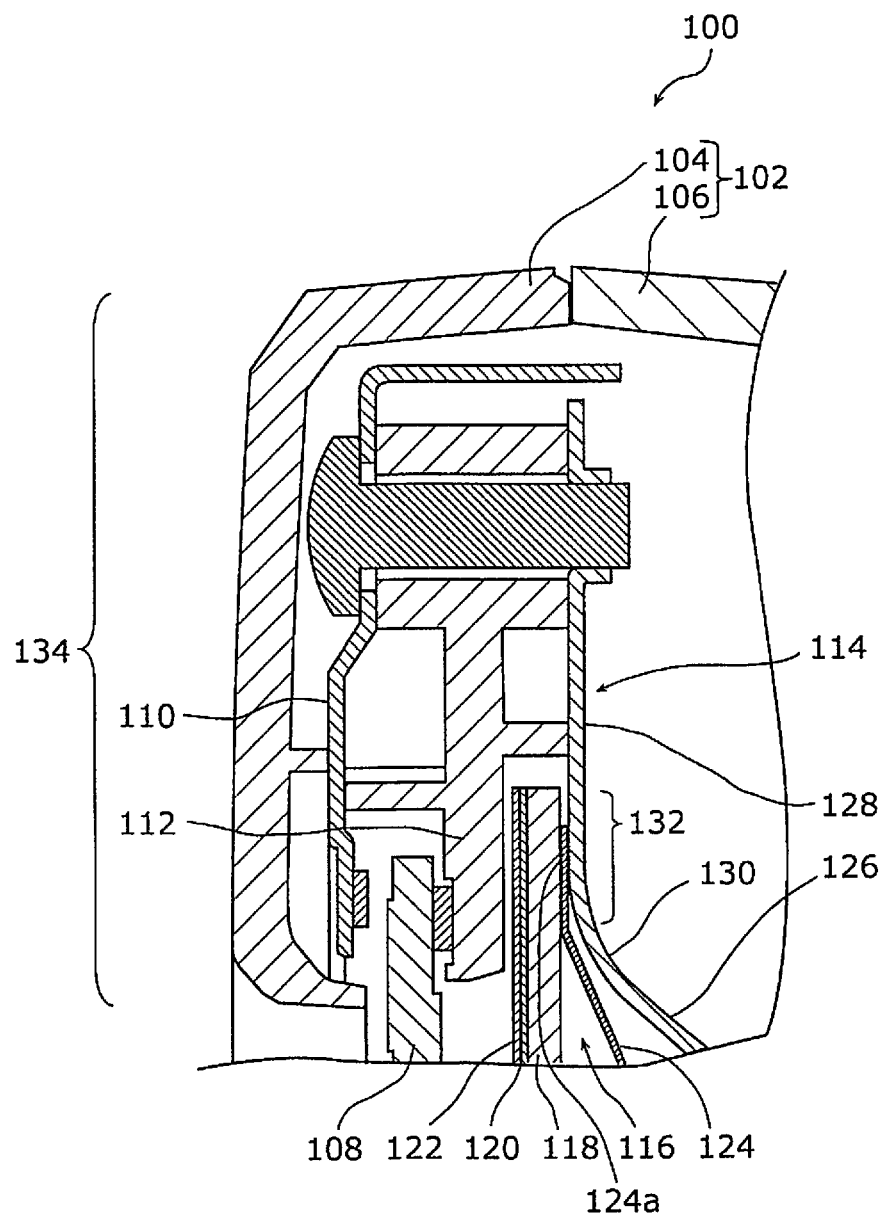
FIG. 12 is a detail cross sectional view of a display device in accordance with a comparative example.

Next, referring to FIG. 12, the effect obtained with the display device 2 in this embodiment will be described. FIG. 12 is a detail cross sectional view of a display device 100 in accordance with a comparative example. As shown in FIG. 12, with the display device 100 in accordance with the comparative example, a housing 102 of a display device 100 is made up of a front cabinet 104 and a rear cabinet 106. The front cabinet 104 covers the outer peripheral part of the front face of a liquid crystal panel 108 disposed in the interior of the housing 102. The rear cabinet 106 covers the entire rear face of the liquid crystal panel 108.

In addition to the above-mentioned liquid crystal panel 108, a bezel 110, a molding frame 112, a rear frame 114, a backlight unit 116, a diffuser plate 118, a pair of optical sheets 120 and 122, and so forth are disposed in the interior of the housing 102. The bezel 110 is a metal frame member for supporting the outer peripheral part of the front face of the liquid crystal panel 108. The molding frame 112 is a plastic frame member for supporting the outer peripheral part of the rear face of the liquid crystal panel 108. The rear frame 114 is a metal frame for supporting the backlight unit 116, and is disposed between the liquid crystal panel 108 and the rear cabinet 106. The backlight unit 116 has an LED bar (not shown) and a reflective sheet 124 that reflects light from the LED bar toward the rear face of the liquid crystal panel 108. The diffuser plate 118 and the optical sheets 120 and 122 are disposed between the liquid crystal panel 108 and the backlight unit 116.

The above-mentioned rear frame 114 has a first support component 126 and a second support component 128. The first support component 126 is configured in the form of a box having an opening. This first support component 126 supports the reflective sheet 124 and the LED bar of the backlight unit 116. The second support component 128 extends outward (that is, substantially parallel to the liquid crystal panel 108) from the opening of the first support component 126. This second support component 128 supports the diffuser plate 118, the optical sheets 120 and 122, and the reflective sheet 124.

With the display device 100 in accordance with the comparative example, the above-mentioned rear frame 114 is formed by stamping a piece of sheet metal, for example. Here, to improve the fluidity of the metal material that forms the sheet metal, stamping is performed so that there will be a relatively large radius (radius of curvature) at the peripheral edge 130 between the first support component 126 and the second support component 128. Accordingly, a relatively large support space 132 needs to be ensured on the second support component 128 as a space for supporting the outer peripheral parts of the diffuser plate 118, the optical sheets 120 and 122 and the reflective sheet 124. In recent years there has been a trend toward slimming down the border portion 134, which does not contribute to image display around the liquid crystal panel 108. However, with the configuration of the display device 100 in accordance with the comparative example, the size of the border portion 134 increases corresponding to the support space 132 formed at the second support component 128.

Furthermore, with the display device 100 in accordance with the comparative example, the four corners of the above-mentioned first support component 126 are configured as right-angle corners. Accordingly, when the rear frame 114 is formed by the stamping of sheet metal, stress tends to accumulate in the four corners of the first support component 126. Thus, these four corners can be relatively easily damaged.

Also, with the display device 100 in accordance with the comparative example, as discussed above, a radius is formed all the way around the peripheral edge 130 between the first support component 126 and the second support component 128. Accordingly, there is interference between the four corners of the outer peripheral part 124a of the reflective sheet 124 and the four corners of the peripheral edge 130. This results in that the four corners of the outer peripheral part 124a of the reflective sheet 124 lift up from the rear frame 114.

On the other hand, with the display device 2 in accordance with one embodiment, as discussed above, the third frame component 30 of the rear frame 14 has the first bent part 32, the second bent part 34, and the third bent part 36 formed by bending. Of these, the second bent part 34 supports the outer peripheral parts of the pair of optical sheets 20 and 22, the diffuser plate 18, and the support component 64 of the reflective sheet 60. The second bent part 34 is bent substantially perpendicular to the first bent part 32, so as shown in FIG. 9, just a relatively small support space 84 need be provided to the second bent part 34 as the space for supporting the outer peripheral parts of the pair of optical sheets 20 and 22, the diffuser plate 18, and the support component 64 of the reflective sheet 60. This allows the border portion 86 of the display device 2 to be kept small, resulting in a slimmer border. Thus, a display device with which a slimmer border can be obtained can be provided.

Furthermore, in the formation of the rear frame 14, the formation method can be divided up into the first frame component 26 side and the third frame component 30 side, using a plane defined by the second frame component 28 as a stamping reference plane. Consequently, in the formation of the first frame component 26 and the second frame component 28 by drawing or deep drawing, for example, the radius (the bend radius) can be relatively large at the peripheral edge 52 between the first frame component 26 and the second frame component 28 in order to improve the fluidity of the metal material that forms the sheet metal 44. Meanwhile, in the formation of the third frame component 30 by bending, for example, the radius (the bend radius) can be relatively small at the peripheral edge 42 between the first bent part 32 and the second bent part 34 in order to keep the above-mentioned support space small.

Furthermore, with the method for forming the rear frame 14 in this embodiment, the third frame component 30 is formed by bending after the first frame component 26 and the second frame component 28 are formed by deep drawing, using a plane defined by the second frame component 28 as the stamping reference plane. Consequently, the rear frame 14 can be formed by integral molding (that is, so that there will be no seams). Thus, there will be no seams at the four corners of the rear frame 14, etc., and there will be less leakage of light from the backlight unit 16 to the outside of the housing 4. Furthermore, because there are no seams in the rear frame 14, the stiffness of the frame 14 can be increased, and the number of steps involved in manufacturing the frame 14 can be reduced because there is no need for a step of crimping seams. Also, since the frame 14 is formed by deep drawing and bending, there will be less dimensional variance in formation of the frame 14 than when the frame 14 is formed by repeating bending a number of times, for example, and this affords better dimensional accuracy in the frame 14.

Furthermore, as discussed above, in the formation of the rear frame 14, the sheet metal 44 is bent so as to form the bevel 40 on each of the four corners at the peripheral edge 38 between the second frame component 28 and the first bent part 32. Consequently, as shown in FIGS. 7 and 10, the tops 38*a* of the four corners in the peripheral edge 38 are disposed more to the third frame component 30 side than the second frame component 28. As a result, there is less accumulation of stress in the four corners of the peripheral edge 38, and the four corners of the peripheral edge 38 will be less likely to be damaged. Thus, a display device with which there is less damage to the frame in the formation of the frame can be provided.

Furthermore, as discussed above, of the peripheral edge 42 between the first bent part 32 and the second bent part 34, the radius of the portions 42*a* of the four corners is larger than the radius of the portions 42*b* other than these portions 42*a* of the four corners. If the radius of the portions 42*a* of the four corners of the peripheral edge 42 are the same as the radius of the portions 42*b* other than these portions 42*a* of the four corners, as shown by the one-dot chain line in FIG. 10, then the four corners of the opening 62*a* in the reflector 62 would interfere with the portions 42*a* of the four corners of the peripheral edge 42. Accordingly, because the radius at the portions 42*a* of the four corners of the peripheral edge 42 is larger than the portions 42*b* other than the portions 42*a* of the four corners, the four corners are eased at the opening 62*a* in the reflector 62, which reduces interference between the reflective sheet 60 and the rear frame 14. Thus, a display device with which there is less interference between the reflective sheet and the frame can be provided.

The display device in accordance with one embodiment is illustrated above, but the present invention is not limited to the above embodiment.

In the above embodiment, the display device 2 is illustrated as a liquid crystal television set, but this is not the only option. The display device 2 can instead be a liquid crystal monitor used with a person computer, for example.

In the above embodiment, the backlight unit 16 is configured as a direct backlight unit, but this is not the only option. The backlight unit 16 can instead be configured as an edge-lit backlight unit. In this case, the second frame component 28 can be eliminated from the rear frame 14, for example, so that the rear frame 14 is made up of just the first frame component 26 and the third frame component 30. Furthermore, in this case the rear frame 14 can be formed by bending alone.

In the above embodiment, the third frame component 30 is configured to have the first bent part 32, the second bent part 34, and the third bent part 36, but this is not the only option. The third bent part 36 can be eliminated from these.

In the above embodiment, the first bent part 32 is configured to be inclined outward beyond the perpendicular direction of the second frame component 28, but this is not the only option. The first bent part 32 can be configured to extend substantially perpendicular to the second frame component 28.

In the above embodiment, the molding frame 24 is configured so that it can be separated into four frame members, but this is not the only option. The molding frame 24 can be formed by a single integrated part.

In the above embodiment, the bevels 40 or the beveled (planar) chamfers are formed at the four corners of the peripheral edge 38 between the second frame component 28 and the first bent part 32, but this is not the only option. Rounded or curved chamfer can be formed instead, for example.

In the above embodiment, the rear cabinet 8 is configured to cover the entire rear face of the rear frame 14, but this is not the only option, and can instead be configured to cover only part of the rear face of the rear frame 14.

The display device 2 can be applied as a liquid crystal television set, for example.

In the illustrated embodiment, the display device in accordance with one mode is a display device that includes a display panel, a light source disposed on a rear side relative to the display panel, an optical member disposed on the rear side relative to the display panel, a light source housing component housing the light source, first and second flat components extending in an outward direction relative to an opening edge of the light source housing component, the first and second flat components being substantially parallel to a rear face of the display panel, the second flat component being disposed closer to the display panel than the first flat component, the second flat component supporting the optical member.

The display device can further include a first extending part extending towards the display panel from an outer peripheral part of the first flat component, the second flat component extending from an end portion of the first extending part in the outward direction to sandwich an outer peripheral part of the optical member between the display panel and the second flat component.

With this mode, the display device has the first extending part and the second flat component. The outer peripheral part of the optical member is supported by the second flat component. Here, the first extending part is bent from the outer peripheral part of the first flat component to the display panel side, and the second flat component is bent in the outward direction from the end portion of the first extending part. Thus, only a relatively small support space need be ensured as the space for supporting the outer peripheral part of the optical member at the second flat component. This allows the border portion of the display device to be kept small, and affords a slimmer border. Furthermore, the display device has the light source housing component and the first flat component, which extends in the outward direction relative to the opening edge of the light source housing component. For example, in the formation of the display device, the formation method can be divided up into the light source housing component side and the second flat component side, using a plane defined by the first flat component as a stamping reference plane. Consequently, when the light source housing component and the first flat component are formed by deep drawing of sheet metal, for example, the bend radius can be relatively large at the peripheral edge between the light source housing component and the first flat component in order to improve the fluidity of the metal material that forms the sheet metal. Meanwhile, in the formation of the second flat component by bending of sheet metal, for example, the bend radius can be relatively small at the peripheral edge between the first extending part and the second flat component in order to keep the above-mentioned support space small.

For example, the display device in accordance with one mode can be configured such that a peripheral edge portion between the first flat component and the first extending part has an inclined surface at a location corresponding to a corner of the display panel.

With this mode, the four corners can be the inclined surfaces at the peripheral edge portion between the first flat component and the first extending part. When the first extending part is formed by bending, for example, the inclined surfaces at the four corners of the peripheral edge between the first flat component and the first extending part will reduce the accumulation of stress at the four corners of this peripheral edge. This makes it less likely that the four corners of the peripheral edge will be damaged.

For example, the display device in accordance with one mode can be configured such that the first extending part is inclined in the outward direction relative to a perpendicular direction perpendicular to the first flat component.

With this mode, the first extending part is inclined in the outward direction beyond the perpendicular direction perpendicular the first flat component. Thus, when the first extending part is formed by bending, for example, the bending can be carried out more smoothly.

For example, the display device in accordance with one mode can be configured such that a bend radius of a peripheral edge portion between the first extending part and the second flat component is larger at a location corresponding to a corner of the display panel than at a location corresponding to a middle portion of a side of the display panel. Furthermore, the display device can be configured such that an overlapping width between the outer peripheral part of the optical member and the second flat component that is measured in the outward direction is smaller at a location corresponding to a corner of the display panel than at a location corresponding to a middle portion of a side of the display panel.

With this mode, the bend radius is larger at the four corners of the peripheral edge portion between the first extending part and the second flat component than at portions other than the four corners. Consequently, the four corners of the outer peripheral part of the optical member can be eased, so there will be less interference between a reflective sheet of the optical member and the peripheral edge portion. Furthermore, a support space for supporting a support component of the reflective sheet can be ensured at the second flat component corresponding to the portions of the peripheral edge portion between the first extending part and the second flat component other than the four corners.

For example, the display device in accordance with one mode can further include a front face housing covering an outer peripheral part of a front face of the display panel, a rear face housing covering a rear face of the light source housing component, and a fastening member fastening the rear face housing to the first flat component.

With this mode, the rear face housing is fastened by the fastening member to the first flat component. Thus disposing the fastening face, where the rear face housing and the first flat component are fastened together, on the first flat component keeps the size smaller in the thickness direction of the display device than when this fastening face is disposed on the outer peripheral face of the display device.

For example, the display device in accordance with one mode can further include a front face housing covering an outer peripheral part of a front face of the display panel, a rear face housing covering a rear face of the light source housing component, and a control switch disposed between the rear face housing and the first flat component to control the display device.

With this mode, the control switch is disposed between the rear face housing and the first flat component. This allows the space formed between the rear face housing and the first flat component to be effectively utilized to install the control switch, so less space is taken up.

For example, with the display device in accordance with one mode, the light source housing component, the first flat component and the second flat component are formed by stamping a piece of sheet metal. For example, the light source housing component and the first flat component can be formed by drawing a piece of sheet metal. Also, the second flat component can be formed by forming a piece of sheet metal.

With this mode, the light source housing component and first flat component are formed by drawing (or deep drawing) of sheet metal. The second flat component is formed by the bending of sheet metal. This means that the rear frame, which at least includes the light source housing component, the first flat component and the second flat component, for example, can be formed by integral forming (that is, forming that produces no seams). Thus, there will be no seams at the four corners, etc., of the rear frame, and this reduces leakage of light from the light source to the outside of the display device. Furthermore, because there are no seams, the stiffness of the rear frame can be increased, and the number of steps involved in manufacturing the rear frame can be reduced because there is no need for a step of crimping seams. Also, since the rear frame is formed by drawing (or deep drawing) and bending, there will be less dimensional variance in formation of the rear frame than when the rear frame is formed by repeating bending a number of times, for example, and this affords better dimensional accuracy in the rear frame.

The display device in accordance with one mode is also a display device for displaying an image. The display device includes a display panel configured to display the image, a light source configured to illuminate a rear face of the display panel, and a metal rear frame supporting the light source. The rear frame is configured in the form of a box having an opening, and in which the four corners are chamfered.

With this mode, the four corners of the rear frame are chamfered. When the rear frame is formed by bending, for example, chamfering the four corners of the rear frame will reduce the accumulation of stress at the four corners of this peripheral edge. This makes it less likely that the four corners of the peripheral edge will be damaged.

Furthermore, the display device in accordance with one mode is a display device for displaying an image. The display device includes a display panel configured to display the image, a light source configured to emit light, a reflective sheet having a reflector that is configured to reflect light from the light source toward a rear face of the display panel and a support component provided to an outer peripheral part of the reflector, and a metal rear frame supporting the light source and the reflective sheet. The rear frame has a light source housing component that is configured in the form of a box having an opening, and that supports the light source and the reflective sheet, a first flat component that extends from the opening of the light source housing component in an outward direction that is substantially parallel to the display panel, a first extending part that is bent from the outer peripheral part of the first flat component to the display panel side, and a second flat component that is bent from an end of the first extending part in the outward direction and that supports the support component of the reflective sheet. The bend radius of four corners of a peripheral edge portion between the first extending part and the second flat component is larger than the bend radius at portions other than the four corners.

With this mode, the bend radius of the four corners of the peripheral edge portion between the first extending part and the second flat component is larger than the bend radius at the portions other than the four corners. This eases the four corners of the outer peripheral part of the reflector, so there will be less interference between the reflective sheet and the rear frame. Furthermore, a support space for supporting the support component of the reflective sheet can be ensured at the second flat component corresponding to the portion of the peripheral edge portion between the first extending part and the second flat component other than the four corners.

The display device in accordance with one mode affords a slimmer border.

The display device in accordance with one mode reduces damage to the rear frame during the formation of the rear frame.

The display device in accordance with one mode reduces interference between the reflective sheet and the rear frame.

In accordance with a first aspect, a display device comprises: a display panel; a light source disposed on a rear side relative to the display panel; an optical member disposed on the rear side relative to the display panel; a light source housing component housing the light source; and first and second flat components extending in an outward direction relative to an opening edge of the light source housing component, the first and second flat components being substantially parallel to a rear face of the display panel, the second flat component being disposed closer to the display panel than the first flat component, the second flat component supporting the optical member.

In accordance with a second aspect, the display device according to the first aspect further comprises a first extending part extending towards the display panel from an outer peripheral part of the first flat component, the second flat component extending from an end portion of the first extending part in the outward direction to sandwich an outer peripheral part of the optical member between the display panel and the second flat component.

In accordance with a third aspect, with the display device according to the second aspect, a peripheral edge portion between the first flat component and the first extending part has an inclined surface at a location corresponding to a corner of the display panel.

In accordance with a fourth aspect, with the display device according to the second aspect, the first extending part is inclined in the outward direction relative to a perpendicular direction perpendicular to the first flat component.

In accordance with a fifth aspect, with the display device according to the second aspect, a bend radius of a peripheral edge portion between the first extending part and the second flat component is larger at a location corresponding to a corner of the display panel than at a location corresponding to a middle portion of a side of the display panel.

In accordance with a sixth aspect, with the display device according to the second aspect, an overlapping width between the outer peripheral part of the optical member and the second flat component that is measured in the outward direction is smaller at a location corresponding to a corner of the display panel than at a location corresponding to a middle portion of a side of the display panel.

In accordance with a seventh aspect, the display device according to the first aspect further comprises a front face housing covering an outer peripheral part of a front face of the display panel, a rear face housing covering a rear face of the light source housing component, and a fastening member fastening the rear face housing to the first flat component.

In accordance with an eighth aspect, the display device according to the first aspect comprises a front face housing covering an outer peripheral part of a front face of the display panel, a rear face housing covering a rear face of the light source housing component, and a control switch disposed between the rear face housing and the first flat component to control the display device.

In accordance with a ninth aspect, with the display device according to the first aspect, the light source housing component, the first flat component and the second flat component are formed by stamping a piece of sheet metal.

In accordance with a tenth aspect, with the display device according to the first aspect, the light source housing component and the first flat component are formed by drawing a piece of sheet metal.

In accordance with an eleventh aspect, with the display device according to the first aspect, the second flat component is formed by forming a piece of sheet metal.

In accordance with a twelfth aspect, the display device according to the second aspect further comprises a second extending part extending from an end portion of the second flat component away from the display panel.

In accordance with a thirteenth aspect, with the display device according to the twelfth aspect, the second flat component has a flat surface, a width between an inward peripheral edge of the flat surface of the second flat component and the second extending part that is measured in the outward direction is smaller at a location corresponding to a corner of the display panel than at a location corresponding to a middle portion of a side of the display panel.

In accordance with a fourteenth aspect, the display device according to the first aspect further comprises a front face housing covering an outer peripheral part of a front face of the display panel, a rear face housing covering a rear face of the light source housing component, and a fastening member fastening the front face housing to the second flat component.

In accordance with a fifteenth aspect, with the display device according to the third aspect, the inclined surface has an overall triangular shape as viewed in a normal direction of the inclined surface.

In accordance with a sixteenth aspect, with the display device according to the third aspect, the inclined surface has an edge portion defining a corner of the peripheral edge portion between the first flat component and the first extending part, the edge portion of the inclined surface being slanted towards the display panel as moving towards the corner of the peripheral edge portion between the first flat component and the first extending part.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A display device comprising:
   a display panel;
   a light source disposed on a rear side relative to the display panel;
   an optical member disposed on the rear side relative to the display panel;
   a rear chassis that houses the light source, the rear chassis including an outer peripheral portion with a flat component that extends outward relative to a center of the display device and a bent part that extends perpendicular to the flat component from an outer edge of the flat component, the bent part including a screw hole; and
   a frame member fastened to the bent part of the rear chassis with a screw that is threaded into the screw hole on the bent part of the rear chassis through the frame member, the screw having a longitudinal center axis that extends in a direction that is perpendicular to a normal direction of a display surface of the display panel, with the normal direction being perpendicular to the display surface of the display panel.

2. The display device according to claim 1, wherein the rear chassis is made of a piece of sheet metal and integrated as a one-piece, unitary member.

3. The display device according to claim 1, wherein the frame member is made of a plastic.

4. The display device according to claim 1, wherein the flat component of the rear chassis extends parallel to a display face of the display panel and supports the optical member.

5. The display device according to claim 1, wherein the flat component of the rear chassis supports the optical member from the rear side.

6. The display device according to claim 1, further comprising
   a front face housing covering an outer peripheral part of a display face of the display panel, and
   a rear face housing covering a rear face of the rear chassis.

7. The display device according to claim 6, wherein the rear face housing is made of a plastic.

8. The display device according to claim 6, wherein the front face housing is fastened to the bent part of the rear chassis with the fastening member.

9. The display device according to claim 6, wherein
the front face housing has a front part and an extending part that rearwardly extends from the front part, and
the frame member has a side wall that is disposed between the bent part of the rear chassis and the extending part of the front face housing.

10. The display device according to claim 9, wherein
the rear face housing has a side wall, and
the side wall of the frame member and the extending part of the front face housing are disposed between the bent part of the rear chassis and the side wall of the rear face housing.

11. The display device according to claim 6, wherein
the rear face housing is fastened to the rear chassis with a fastening member.

12. The display device according to claim 11, wherein
the rear face housing is fastened to the rear chassis with the fastening member at a location inward of the outer peripheral portion of the rear chassis relative to the center of the display device.

13. The display device according to claim 1, wherein
the frame member has a side wall and an extending part that inwardly extends from the side wall, and
an outer peripheral part of the optical member is disposed between the extending part of the frame member and the flat component of the rear chassis.

14. The display device according to claim 13, wherein
the extending part of the frame member supports an outer peripheral part of the display panel.

15. The display device according to claim 1, wherein
the rear chassis includes a light source housing component that supports the light source.

16. The display device according to claim 15, wherein
the rear chassis includes an additional flat component that extends outward from an edge of the light source housing.

17. The display device according to claim 16, wherein
the flat component of the rear chassis is disposed closer to the display panel than the additional flat component of the rear chassis.

18. The display device according to claim 16, wherein
the rear chassis includes an additional bent part extending between an outer edge of the additional flat component and an inner edge of the flat component.

19. The display device according to claim 18, wherein the additional bent part of the rear chassis is inclined relative to the bent part of the rear chassis.

* * * * *